United States Patent [19]

Tobias

[11] 4,414,283

[45] Nov. 8, 1983

[54] ACRYLIC MODIFIED ANIONIC WATER DISPERSIBLE STYRENE ALLYL ALCOHOL COPOLYMERS

[75] Inventor: Michael A. Tobias, Bridgewater, N.J.

[73] Assignee: Mobil Oil Corporation, New York, N.Y.

[21] Appl. No.: 426,529

[22] Filed: Sep. 29, 1982

Related U.S. Application Data

[62] Division of Ser. No. 274,588, Jun. 17, 1981, Pat. No. 4,360,640.

[51] Int. Cl.$^3$ ............................................. B32B 15/08
[52] U.S. Cl. ................................... 428/461; 524/504; 524/529; 524/533; 524/535
[58] Field of Search ................ 428/461; 524/529, 533, 524/504, 535

[56] References Cited

U.S. PATENT DOCUMENTS

| | | | |
|---|---|---|---|
| 2,461,423 | 11/1960 | Chapin | 524/529 |
| 4,212,781 | 7/1980 | Evans et al. | 525/63 |
| 4,308,185 | 12/1981 | Evans et al. | 525/63 |

*Primary Examiner*—Joseph L. Schofer
*Assistant Examiner*—Bernard Lipman
*Attorney, Agent, or Firm*—Alexander J. McKillop; James F. Powers, Jr.; Edward J. Trojnar

[57] ABSTRACT

This invention provides a graft copolymer of at least one acrylic monomer and a random copolymer of a styrene and allyl alcohol, in which at least about 8 percent of the total weight of said graft copolymer is derived from acrylic acid, methacrylic acid, or both. It also provides anionic aqueous dispersions of such graft copolymers and coating compositions containing them.

11 Claims, No Drawings

ACRYLIC MODIFIED ANIONIC WATER DISPERSIBLE STYRENE ALLYL ALCOHOL COPOLYMERS

This is a division, of application Ser. No. 274,588 filed June 17, 1981 U.S. Pat. No. 4,360,640.

BACKGROUND OF THE INVENTION

1. Field of the Invention

This invention is concerned with acrylic modified copolymers of styrene and allyl alcohol.

2. Description of the Prior Art

Insofar as is now known, the polymers of this invention have not been proposed.

SUMMARY OF THE INVENTION

This invention provides a graft copolymer of at least one acrylic monomer and a random copolymer of a styrene and allyl alcohol, in which at least about 8 percent of the total weight of said graft copolymer is derived from acrylic acid, methacrylic acid, or both. It also provides anionic aqueous dispersions of such graft copolymers and coating compositions containing them.

DESCRIPTION OF THE SPECIFIC EMBODIMENTS

The main backbone chain of the graft copolymers of this invention are random copolymers of a styrene and allyl alcohol. Styrene is a preferred monomer, but other styrene monomers are contemplated and can be used, such as α-methylstyrene, p-methylstyrene, dimethylstyrene, ethylstyrene, chlorostyrene, dichlorostyrene, and the like. The amount of allyl alcohol in the random copolymer will be between about 20 percent and about 30 percent of the weight of the copolymer, with the balance being a styrene.

The copolymerization is carried out by any of the means well known in the art. Typically, the monomers are dissolved in a suitable solvent, such as methyl ethyl ketone, methoxyethanol, ethoxyethanol, and the like. The copolymerization can be carried out under free radical conditions using a suitable free radical initiator, such as t-butyl perbenzoate or benzoyl peroxide. The temperature used is the activation temperature of the catalyst.

The random copolymer is grafted with at least one acrylic monomer. Various acrylic monomers and monomers copolymerizable therewith can be used. In order to provide sufficient free carboxyl groups to render the graft copolymer water dispersible, however, at least about 8 percent of its weight must be acrylic acid or methacrylic acid moieties. The acrylic monomers can all be acrylic acid or methacrylic acid or it can be a mixture of acrylic monomers or of acrylic monomers and other monomers polymerizable therewith, provided that sufficient acrylic or methacrylic acid is used to amount to at least about 8 percent of the total weight of the graft copolymer. Non-limiting examples of utilizable acrylic monomers are acrylic acid, methacrylic acid, methyl acrylate, methyl methacrylate, ethyl acrylate, ethyl methacrylate, propyl acrylate, propyl methacrylate, butyl acrylate, butyl methacrylate, hydroxyethyl acrylate, hydroxyethyl methacrylate, hydroxypropyl methacrylate, acrylonitrile, methyacrylonitrile acrylamide, methacrylamide, and monomers copolymerizable therewith, such as styrene, p-methylstyrene and lower monoolefins.

The graft copolymerization can be carried out by polymerizing the acrylic monomer or monomers in a solution of the random copolymer backbone resin under free radical conditions. The solvent, free radical initiator, and temperature can be as described hereinbefore for the random copolymer preparation.

In forming a coating composition containing the acidic graft copolymer resin, the resin is neutralized with a tertiary amine, ammonia, or ammonium hydroxide to a pH about 7.0 to about 9.0. Typical amines utilizable include triethylamine, tripropylamine, dimethylethanolamine, diethylethanolamine, dimethylethylamine, and methyldiethylamine.

In the finished coating composition, the resin solids content will be about 10 to about 40 weight percent. The volatile system (including amine, ammonia, or ammonium hydroxide) will be between about 90 weight percent and about 60 weight percent of the finished coating composition, preferably about 75-85 weight percent. About 65 to 90 weight percent of the volatile system will be water and the balance (35 to 10 weight percent) will be organic volatile solvents, including amine, ammonia, or ammonium hydroxide. Preferably, the ratio of water to organic volatiles will be about 70:30 to 80:20 in the volatile system. Each component of the solvent system will be present in between about one weight percent and about 20 weight percent of the weight of the final composition. A typical and preferred solvent system is defined in the working examples.

The coating composition will contain a cross-linking agent, such as an aminoplast or one of the well known diisocyanates such as tolylene diisocyanates. The preferred material used to thermoset the coating is conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2-phenyl-p-oxy-4,6-diamino-1,3,5-triazine, 6-methyl-2,-4-diamino-1,3,5-triazine; 2,4,6-trihydrazine-1,3,5-triazine, and 2,4,6-triethyltriamino-1,3,5-triazine. The mono-, di-, or trialkyl or mono, di-, or triaryl melamines, for instance, 2,4,6-triphenyltriamino-1,3,5-triazine can be used. Also utilizable are benzoguanamine and hexamethoxymethyl melamine. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, and the like. It is preferred to use an aminoplast that is water soluble. The amount of cross-linking agent used is generally between about 15 weight percent and about 40 weight percent, based on total resin solids.

The coating composition of this invention is primarily useful for coating aluminum, tin plated steel, pretreated metals, steel, and metals coated with the same or different resin composition (i.e., a second coat). The coating composition can be used, however, for coating other substrates such as wood, paper and leather. The most preferred and useful use of the coating composition is for coating of cans, coil stock, and fabricated metal. Coating can be done by any coating procedure well known to those skilled in the art including direct roll-coating, electrodeposition, spraying, flow coating and the like. After coating the substrate, the coating is baked for about one minute to about 30 minutes at between about 120° C. and about 260° C.

EXAMPLE 1

A two liter resin kettle was charged with 400.0 g. of RJ-101 (a copolymer of styrene-allyl alcohol, Mn=1150, Mw=1700, hydroxyl content=7.7±0.3%) and 100.0 g. of Cellosolve. It was heated to 110° C. under nitrogen to dissolve the flaked polymer, at which time a solution of 38.0 g. of methacrylic acid and 3.0 g. of benzoyl peroxide was added dropwise over a 30 minute period. The reaction mixture was held at 110° C. for one hour and then cooled to 90° C. whereupon 0.75 g. of additional-benzoyl peroxide was added. After an additional hour at 90° C., 34.5 g. of dimethylethanolamine and 34.5 g. of deionized water were added. Subsequently, 642.5 g. of deionized water was added dropwise over a two hour period. The resulting aqueous dispersion (pH=7.20, Brookfield viscosity=185 cps.) was determined to contain 36.5 percent non-volatile material (2 hrs. @150° C.) with an acid number of 54.7 (on solids).

EXAMPLE 2

A two liter resin kettle was charged with 175.0 g. of RJ-101 and 125.0 g. of Cellosolve. It was heated to 110° C. under nitrogen to dissolve the flaked polymer, at which time a solution of 45.5 g. of methacrylic acid, 35.8 g. of methyl methacrylate, 195.0 g. of butyl acrylate, 48.7 g. of hydroxyethyl methacrylate and 26.0 g. of benzoyl perioxide was added dropwise over a three hour period. The reaction mixture was held at 110° C. for one hour and then cooled to 90° C. whereupon 3.3 g. of additional benzoyl peroxide was added. After an additional hour at 90° C., 42.4 g. of dimethylethanolamine and 42.4 g. of deionized water were added. Subsequently, 1119.2 g. of deionized water was added over a two hour period. The resulting aqueous dispersion (pH=7.60, Brookfield viscosity=95 cps.) was determined to contain 29.0 percent non-volatile material (2 hrs. @150° C.) with an acid number of 68.9 (on solids).

EXAMPLE 3

Using the techniques described in Examples 1 and 2, a resin and an aqueous dispersion thereof was prepared. The weight percent of the resin components and the final constants of the dispersion are set forth in the Table.

EXAMPLE 4

Using the technique described in Examples 1 an 2, a resin and an aqueous dispersion thereof were prepared. The weight percent of the resin components and the final constants of the dispersion are set forth in the Table.

TABLE

| Ex. No. | Components, Wt % | | | % NV | Visc., (cps) | A.N. | pH |
|---|---|---|---|---|---|---|---|
| | RJ-100[1] | MAA[2] | BA[3] | | | | |
| 3 | 50.0 | 9.2 | 40.8 | 31.1 | 50 | 66.4 | 7.76 |
| 4 | 50.0 | 11.5 | 38.5 | 30.5 | 70 | 84.6 | 7.83 |

[1]Styrene-allyl alcohol copolymer, Mn = 160, Mw = 2300, Hydroxyl Eq. Wt. = 200 ± 15
[2]Methacrylic acid
[3]Butyl Acrylate

EXAMPLE 5

The dispersion of Example 2 was blended with 15% on resin solids of a methylated melamine cross-linking agent (Resimine 714, 80% solids in water). The resultant clear coating was drawn down on 25 mil alodized aluminum at 0.9 mil dry film thickness and baked at 150° C. for 10 minutes. The cured film showed good gloss and clarity, passed 100 MEK double rubs and had a Knoop hardness of 16.2.

EXAMPLE 6

The dispersion of Example 3 was blended with 40% on resin solids of hexamethoxymethylmelamine. The resultant clear coating was applied by draw down bar on 25 mil alodized aluminum at 0.9 mil dry film thickness and baked at 177° C. for 10 minutes. The cured film showed good gloss and clarity, passed 100 MEK double rubs, had a Knoop hardness of 23.3, and showed only a few microscopic cracks on a 24 in.-lb. reverse impact test.

EXAMPLE 7

The dispersion of Example 4 was blended with 15% on resin solids of Resimine 714. The resultant clear coating was drawn down on 25 mil alodized aluminum at 0.9 mil dry film thickness and baked at 150° for 10 minutes. The cured film showed good gloss and clarity, had a Knoop hardness of 28.8, and showed only slight cracking on 24 in.-lb. reverse impact test.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A coating composition comprising:
   (A) a water-dispersible graft copolymer of an acrylic monomer or monomers and a random copolymer of a styrene and between about 20 weight percent and 30 weight percent of the random copolymer of allyl alcohol, in which at least about 8 percent of the total weight of said graft copolymer is derived from acrylic acid, methacrylic acid, or both, said graft copolymer being neutralized with ammonia, ammonium hydroxide, or a tertiary amine; and
   (B) a cross-linking agent;
said composition being diluted with water to a solids content of between about 10 weight percent and about 40 weight percent.

2. A composition according to claim 1 wherein the styrene in the random copolymer component of said graft copolymer is styrene.

3. A composition according to claim 2 wherein the acrylic monomer in said graft copolymer component is methacrylic acid.

4. A composition according to claim 2 wherein the acrylic monomers in said graft copolymer component are methacrylic acid, methyl methacrylate, butyl acrylate, and hydroxyethyl methacrylate.

5. A composition according to claim 2 wherein the acrylic monomers in said graft copolymer compound are methacrylic acid and butyl acrylate.

6. A substrate coated with the coating composition of claim 1 and baked.

7. A substrate coated with the coating composition of claim 2 and baked.

8. A substrate coated with the coating composition of claim 3 and baked.

9. A substrate coated with the coating composition of claim 4 and baked.

10. A substrate coated with the coating composition of claim 5 and baked.

11. A coated substrate of claim 6, 7, 8, 9, or 10, wherein said substrate is a metal substrate.

* * * * *